(12) United States Patent
D'Alto et al.

(10) Patent No.: US 9,411,334 B2
(45) Date of Patent: Aug. 9, 2016

(54) AIRCRAFT GUIDANCE METHOD AND SYSTEM

(75) Inventors: Luis P. D'Alto, Madrid (ES); Christian Grabow, Madrid (ES)

(73) Assignee: The Boeing Company, Chicago, IL (US)

( * ) Notice: Subject to any disclaimer, the term of this patent is extended or adjusted under 35 U.S.C. 154(b) by 749 days.

(21) Appl. No.: 13/595,399

(22) Filed: Aug. 27, 2012

(65) Prior Publication Data

US 2013/0082148 A1 Apr. 4, 2013

(30) Foreign Application Priority Data

Oct. 4, 2011 (EP) ..................................... 11382311

(51) Int. Cl.
*G05D 1/10* (2006.01)
*G05D 1/02* (2006.01)
*B64C 19/00* (2006.01)

(52) U.S. Cl.
CPC .............. *G05D 1/0202* (2013.01); *B64C 19/00* (2013.01)

(58) Field of Classification Search
CPC ................................ B64C 19/00; B64C 13/16
USPC ........................ 244/175, 177, 194, 195, 76 R
See application file for complete search history.

(56) References Cited

U.S. PATENT DOCUMENTS

| | | | | |
|---|---|---|---|---|
| 3,601,588 A | * | 8/1971 | Bristol | 700/31 |
| 3,793,574 A | * | 2/1974 | Hamel | 318/561 |
| 3,980,258 A | | 9/1976 | Simeon | |
| 4,074,648 A | * | 2/1978 | Reid et al. | 114/144 RE |
| 5,406,488 A | * | 4/1995 | Booth | 701/1 |
| 7,010,398 B2 | * | 3/2006 | Wilkins et al. | 701/3 |

FOREIGN PATENT DOCUMENTS

| | | |
|---|---|---|
| EP | 0036771 A2 | 9/1981 |
| EP | 0471395 A2 | 2/1992 |

OTHER PUBLICATIONS

European Search Report dated Jul. 16, 2012 in EP Application No. 11382311.6-1239.

* cited by examiner

*Primary Examiner* — Brian M O'Hara
*Assistant Examiner* — Keith L Dixon
(74) *Attorney, Agent, or Firm* — Baldauff IP, LLC; Michael J. Baldauff, Jr.

(57) ABSTRACT

A system and method for steering aircraft along a predetermined track is disclosed herein. The system and method relate to steering an aircraft along a lateral path (e.g. a track described by reference to latitude and longitude) by a method comprising: calculating a nominal track correction; providing an upper limit and a lower limit for the nominal track correction; setting a desired track correction as: (i) the nominal track correction if the nominal track is between the upper limit and the lower limit; (ii) the upper limit if the nominal track correction is greater than or equal to the upper limit; or (iii) the lower limit if the nominal track correction is less than or equal to the lower limit; and steering the aircraft using the desired track correction.

15 Claims, 4 Drawing Sheets

AIRCRAFT GUIDANCE METHOD AND SYSTEM

CROSS REFERENCE TO RELATED APPLICATIONS

This application claims priority to European Application No. EP11382311 filed on Oct. 4, 2011, the contents of which are incorporated by reference herein.

TECHNICAL FIELD

The subject matter disclosed herein relates to a system and method for steering aircraft along a predetermined track. Particularly, but not exclusively, the subject matter relates to steering an aircraft along a lateral path (e.g. a track described by reference to latitude and longitude).

BACKGROUND

It is often the case that aircraft are required to leave a planned track owing to conflicting air-traffic or adverse weather conditions. When this happens, it is necessary for the aircraft to return to the planned track (or to follow a new track) from an arbitrary location that may be distant therefrom.

There are three phases to returning to follow the planned track: intercept, capture and tracking. The intercept phase involves steering the aircraft onto a path which meets the target track. In the capture phase the aircraft is steered towards the target track such that its actual path converges on that of the planned route. The tracking phase maintains the aircraft's position on the track.

Conventional approaches for guiding an aircraft to a planned track are typically complicated and operate separate modes for each of intercept, capture and tracking. These modes will be carried out by different control systems. Such approaches increase the complexity of flight management systems and have the problem of ensuring a seamless and stable transition from one mode to another.

Alternative approaches having only a single control system generally involve increased complexity and are therefore computationally expensive.

SUMMARY

There is disclosed herein a method having an easily configurable control system without high associated computational load for controlling an aircraft capable of achieving intercept, capture and tracking functionality with a single mode.

DETAILED DESCRIPTION

The following detailed description is merely illustrative in nature and is not intended to limit the embodiments disclosed herein or the application or uses of such embodiments. Furthermore, there is no motivation to be bound by any express or implied theory expressed herein.

The following discloses a method and a system for steering an aircraft using a simple controller. In order to provide a system with lower complexity than that of the prior art, whilst maintaining the functionality of interception, capture and tracking, the system may include a simple controller for providing a desired track correction, the output of which is limited to fall within upper and lower bounds. In this way, when the controller outputs a signal indicating a track correction larger than the upper bound, the track correction is reduced to the value of the upper bound. Similarly, when the controller outputs a signal indicating a track correction smaller than the lower bound, the track correction is increased to the value of the lower bound. The bounds may vary in dependence upon various criteria as explained in more detail below.

Figure 1:
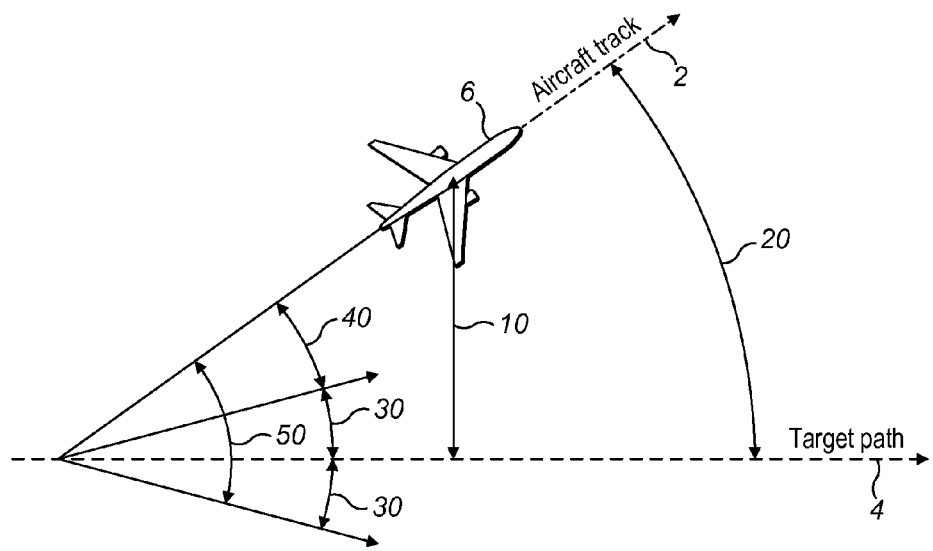
FIG. 1 illustrates a distance error between a current aircraft track path and a predetermined aircraft track path.

FIG. 1 shows an aircraft 6 travelling along a current aircraft track 2. FIG. 1 represents the path of the aircraft in the horizontal plane, and the following description is also made with reference to following a path in a horizontal plane. As shown in FIG. 1, a predetermined track 4 is provided for the aircraft 6. The aircraft track 2 does not coincide with the predetermined track 4. As a result, the aircraft 6 has a distance error 10, representing its displacement from the predetermined track. The aircraft track 2 differs from the predetermined track 4 by an angle error 20.

Figure 2:
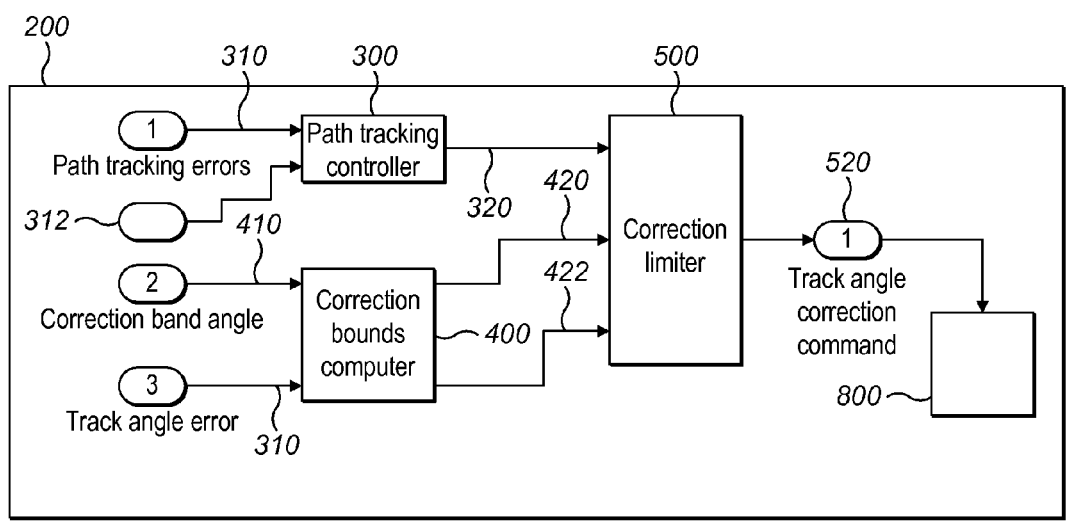
FIG. 2 shows an example of a control system disclosed herein.

FIG. 2 shows a schematic overview of a control system disclosed herein. The control system 200 may comprises a path tracking controller 300; a correction bounds computer 400; and a correction limiter 500. The path tracking controller 300, the correction bounds computer 400, and the correction limiter 500 may be formed as hardware components, or exist as software instructions to be implemented by a single hardware component.

In general terms, the path tracking controller 300 receives an input of a track angle error 310 and a track distance error 312, which it processes to output a nominal track correction 320. The nominal track correction 320 forms the input of the track angle correction limiter 500, which enforces upper and lower bounds 420, 422 on the nominal track correction 320. If the nominal track correction 320 is within the bounds, the track angle correction limiter 500 outputs nominal track correction 320 as the desired track correction 520 without modification. If the nominal track correction 320 is not within the bounds, the track angle correction limiter 500 sets the desired track correction 520 to the value of the nearest bound 420, 422. The value of the upper and lower bounds 420, 422 may be determined using the correction bounds computer 400. The desired track correction 520 is communicated to a flight computer 800, which steers the aircraft towards a track determined as the aircraft's desired path.

Figure 3:
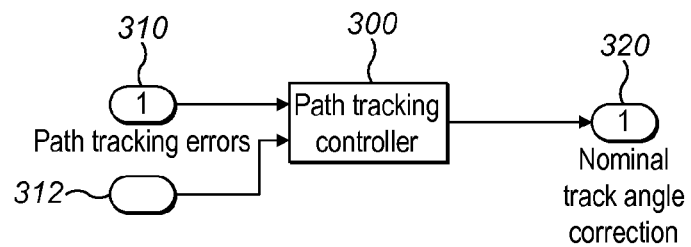
FIG. 3 shows a path tracking controller of the control system of FIG. 2.

The path tracking controller 300 is shown in FIG. 3. In this embodiment, the path tracking controller has two inputs, the track angle error 310 and the track distance error 312. Track angle error 310, corresponds with angle 20 shown in FIG. 1. Track distance error 312, corresponds with distance 10 shown in FIG. 1.

The controller 300, for example, a linear controller, may apply any type of control algorithm. Ordinarily a linear controller would not have sufficient complexity to carry out intercept, capture and tracking operations, but when used in the disclosed method, a linear control is sufficient. Preferably, controller 300 applies a conventional Proportional-Differential (PD) control algorithm or Proportional-Integral-Differential (PID) control algorithm. Such PD and PID algorithms are well known in the art.

As indicated above, the controller 300 may be a conventional, linear tracking controller. Such a controller can be designed and calibrated to prevent an aircraft from diverging from a path. In other words, although the controller 300 when used in the disclosed method can provide intercept, capture and tracking functionality, the controller 300 is arranged merely to carry out the task of tracking and is calibrated accordingly. The controller 300 outputs the nominal track correction 320 determined by the control algorithm using the track angle error 310 and track distance error 312.

Figure 4:
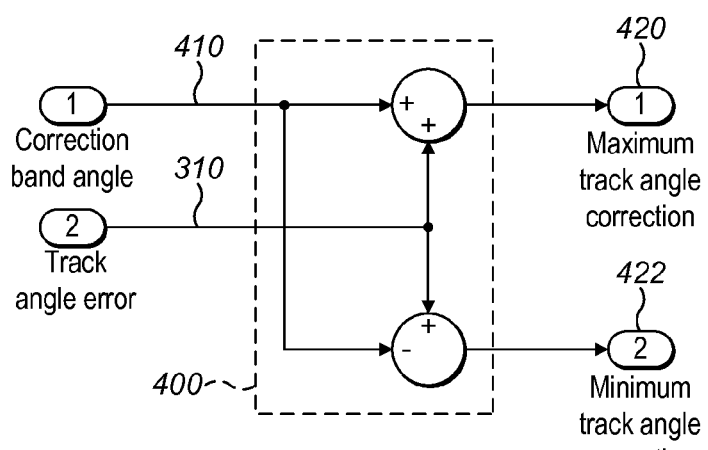
FIG. 4 shows a correction bounds computer of the control system of FIG. 2.

The correction bounds computer 400 is shown in FIG. 4. The inputs of the correction bounds computer 400 are a correction band angle 410 and the track angle error 310. The correction band angle 410 is an angle representing the greatest permitted magnitude of the difference between the desired track correction 520 and the track angle error 310. The correction bounds computer 400 calculates an upper bound 420 for the nominal track correction 320 as the sum of the correction band angle 410 and the track angle error 310. The correction bounds computer 400 calculates a lower bound 422 for the nominal track correction 320 as the track angle error 310 minus the correction band angle 410. The correction band angle 410 is represented in FIG. 1 by angles 30. The upper bound 420 is represented by angle 50 and the lower bound 422 is represented by angle 40. The correction bounds computer 400 outputs the upper bound 420 and the lower bound 422.

Figure 5:
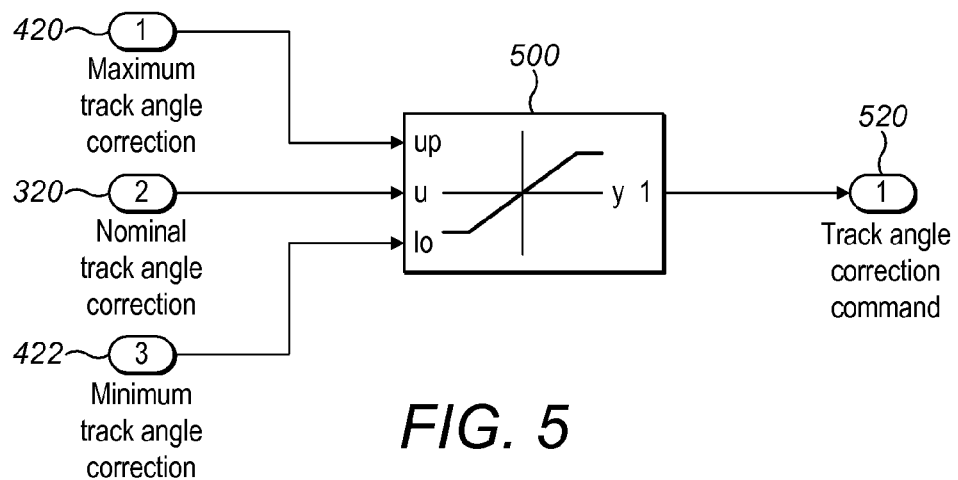
FIG. 5 shows a track angle correction limiter of the control system of FIG. 2.

As shown in FIG. 5, the track angle correction limiter 500 receives the nominal track correction 320 as an input, along with the upper bound 420 and the lower bound 422 calculated by the correction bounds computer 400.

The track angle correction limiter 500 compares the nominal track correction 320 with the upper bound 420 and the lower bound 422. The track angle correction limiter 500 sets the value of the desired track correction 520 as the nominal track correction 320 if the nominal track 320 is between the upper limit 420 and the lower limit 422. The track angle correction limiter 500 sets the value of the desired track correction 520 as the upper limit 420 if the nominal track correction 320 is greater than or equal to the upper limit 420. The track angle correction limiter 500 sets the value of the desired track correction 520 as the lower limit 422 if the nominal track correction 320 is less than or equal to the lower limit 422.

In one embodiment, the correction band angle 410, which forms an input of the correction bounds computer 400, is a function of the track distance error 312. For example, the correction band angle 410 may be calculated using the system 600 shown in FIG. 6. The track distance error 312 is compared with a distance threshold 610.

If the track distance error 312 is greater than the distance threshold 610, the correction band angle 410 is set at a first band angle value. For example, the band angle may be set to 90°. If the track distance error 312 is not greater than the distance threshold 610, the correction band angle 410 is set at a second band angle value, smaller than the first band angle value. For example, the band angle may be set to 30°. The distance threshold 610 will vary in accordance with the type of aircraft for which the invention is applied.

Figure 7:
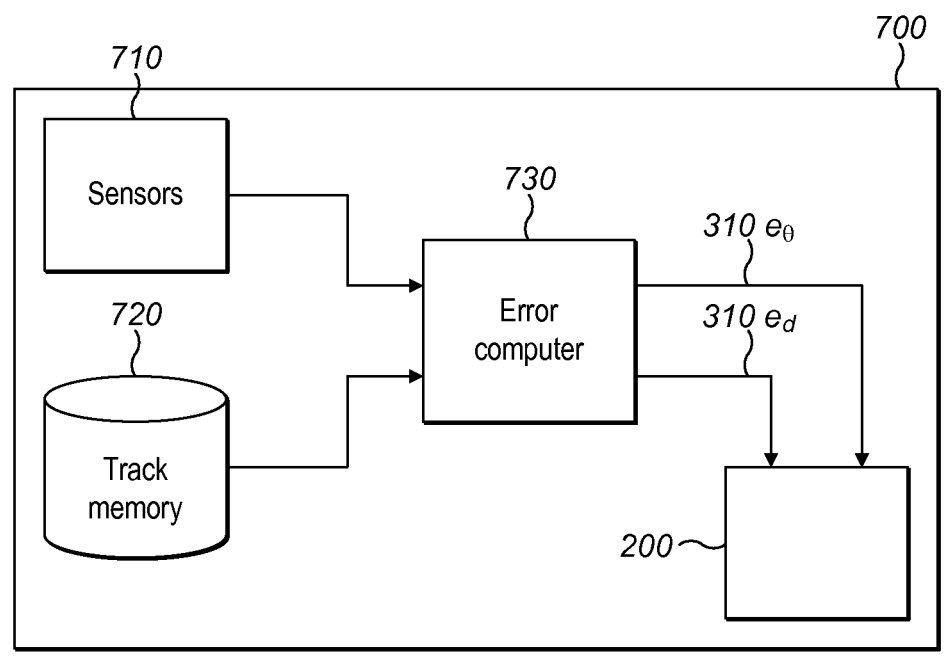
FIG. 7 shows an example system for determining tracking errors.

FIG. 7 shows a system 700 comprising the system 200 disclosed above. The system 700 comprises sensors 710, a memory 720, an error computer 730, and the system 200 disclosed above. The sensors 710 monitor the aircraft's current position and current track. The sensors 710 output an aircraft position signal representing the aircraft's current position and an aircraft track signal representing the aircraft's current track. The memory 720 stores the predetermined track to be followed by the aircraft. The memory 720 can be any form of memory, including both volatile (e.g. RAM) or non-volatile (e.g. a hard disc). The error computer 730 receives the aircraft position signal and the aircraft track signal from the aircraft sensors 710, and accesses the memory 720 to determine a desired aircraft track. The error computer 730 calculates the track angle error 310 as the angle between the current aircraft track and the desired aircraft track. The error computer 730 calculates the track distance error 312 as the distance between the current aircraft position determined from the aircraft position signal and the predetermined track accessed from the memory 720.

System 700 may be embodied as an aircraft or a ground-station arranged to remotely control an aircraft. In either case, the sensors 710 may be aircraft-based sensors such as a GPS, a barometric altimeter, an electronic compass, a gyrocompass, or an inertial navigation system, etc. or may be ground-based sensors such as a radar system.

Figure 6:
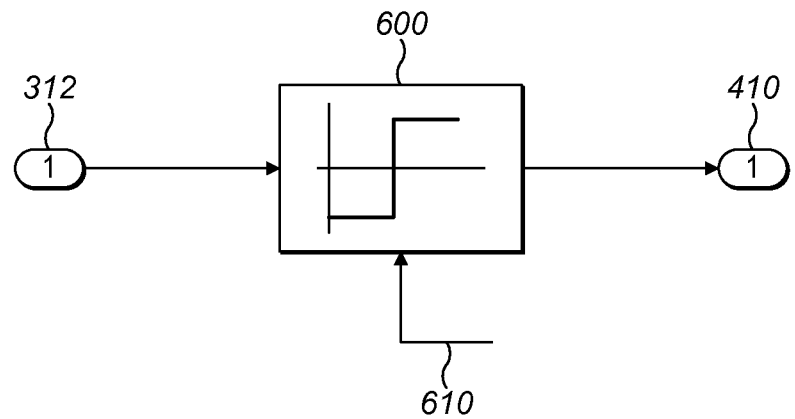
FIG. 6 shows an example of a system for determining a correction band angle.

As an alternative to the system of FIG. 6 above, the correction band angle 410 may be based upon the track angle error 310. For example, the correction band angle 410 may vary in proportion to the track angle error 310.

Moreover, the correction band angle 410 may be based upon both the track angle error 310 and the track distance error 312. For example, by summing the values resulting from the above two methods.

Furthermore, instead of calculating the upper limit 420 and lower limit 422 as the sum and difference of the track angle error 310 and the correction band angle 410, the correction bounds computer 400 may have inputs in the form of a scaling factor and may calculate the upper limit 420 and lower limit 422 in proportion to the track angle error 310.

Figure 8:
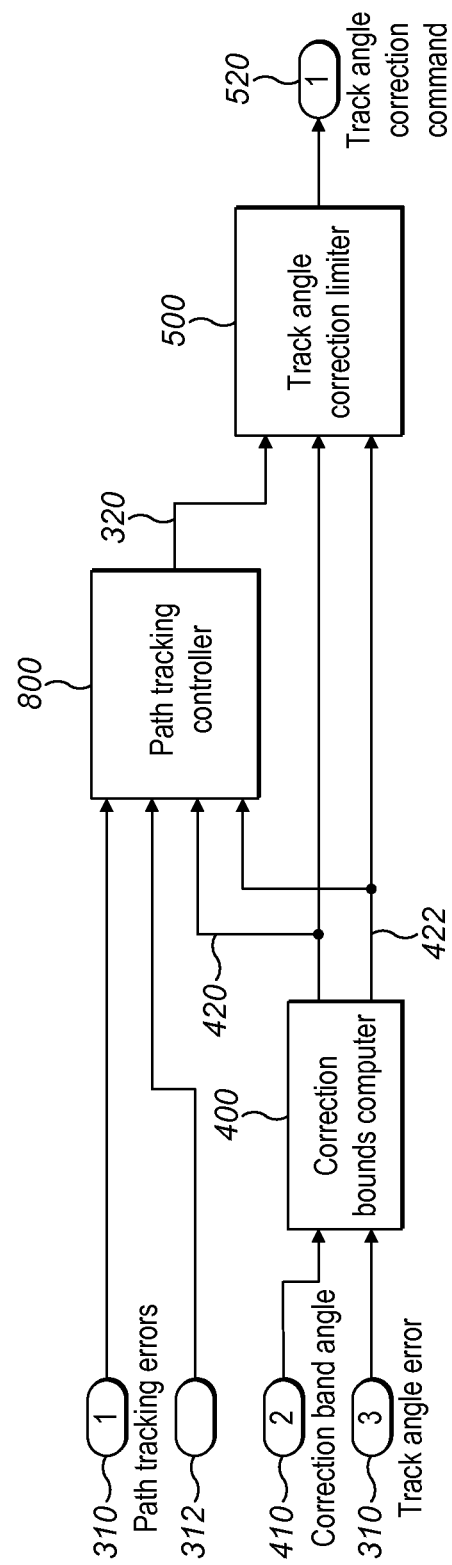
FIG. 8 shows another example of a control system as disclosed herein.

FIG. 8 shows a schematic overview of another embodiment of the control system of the invention. This control system differs from that shown in FIG. 2 by the presence of an alternative path tracking controller 800 replacing the path tracking controller 300. The path tracking controller 800 applies a simple PID control algorithm. The PID algorithm calculates a control signal as the weighted sum of three terms: (i) a term proportional to the tracking error; (ii) a term proportional to the derivative of the tracking error with respect to time; and (iii) a term proportional to the integral of the tracking error over time.

As is known in the art, correct operation of PID controllers may be hindered by actuator saturation whereby the magnitude of a control signal from a controller exceeds that achievable by an actuator. This is caused by the continual integration of errors by the controller when the actuator has saturated. This hindrance is often compensated for by a technique called "wind-up compensation". Wind-up compensation is a technique in which the output of the integrator is limited to prevent the control signal from causing actuator saturation.

The path tracking controller 800 in this embodiment uses an algorithm incorporating wind-up compensation. As can be seen from FIG. 8, the outputs of the correction bounds computer 400 (the upper bound 420 and the lower bound 422) form inputs to the controller 800. The path tracking controller 800 applies a PID control algorithm in which the integral term is limited in dependence upon the upper bound 420 and the lower bound 422.

Whilst in FIG. 1, only a straight predetermined track 4 is shown, it would be understood by the skilled person that the disclosed method is also appropriate for intercepting, capturing and tracking curved paths. A method for tracking of curved paths involves identifying the closest point on the path to the aircraft 6 (i.e. determining the point on the path which corresponds with the minimum value of the distance error 10). The angle error 20 is then calculated as the angle between the aircraft track 2 and the tangent to the predetermined track 4 at the identified closest point.

The above disclosed control method, where the track is defined in a lateral or horizontal plane and altitude is not considered by the method, has been described with reference to two dimensions, but clearly the principles are applicable in a fully three-dimensional system.

Whilst reference has been made above to track angle error 310 and track distance error 312 as the inputs to the controller 300, it will be apparent to the skilled person that alternative, or additional, error measures are possible. What is important is that the controller 300 outputs a nominal track correction 320 that can be subsequently, and deliberately, limited by the track angle correction limiter 500.

The above disclosed control system and each of the subsystems shown in the figures can be implemented as one or more electronic circuits, or as software on one or more computer processors. The method may be embodied as a computer program product stored on a computer readable medium comprising instructions that when executed by a computer can be used to steer an aircraft.

The many features and advantages of the subject matter disclosed herein are apparent from the specification and, thus, it is intended by the appended claims to cover all such features and advantages which fall within the scope disclosed herein. Numerous modifications and variations will occur to these skilled in the art and it is therefore not intended to limit the embodiments to the exact construction and operation illustrated and described.

The invention claimed is:

1. A method of steering an aircraft to follow a predetermined track, comprising:
   calculating a nominal track correction;
   providing an upper limit and a lower limit for the nominal track correction, wherein the upper limit and the lower limit are calculated in dependence upon the difference between a current aircraft position and the predetermined track;
   setting a desired track correction as:
      the nominal track correction if the nominal track correction is between the upper limit and the lower limit,
      the upper limit if the nominal track correction is greater than or equal to the upper limit, and
      the lower limit if the nominal track correction is less than or equal to the lower limit; and
   steering the aircraft using the desired track correction.

2. The method of claim 1, wherein the nominal track correction is calculated using a linear controller.

3. The method of claim 1, further comprising:
   monitoring a current aircraft track and the current aircraft position;
   determining a desired aircraft track;
   calculating a track angle error as the difference between the current aircraft track and the predetermined aircraft track; and
   calculating a track distance error as the difference between the current aircraft position and the predetermined track,
   wherein the nominal track correction is calculated based upon the track angle error and the track distance error.

4. The method of claim 3, wherein providing an upper limit and a lower limit for the nominal track correction, comprises:
   providing a correction band angle;
   calculating the upper limit as the sum of the track angle error and the correction band angle; and
   calculating the lower limit as the track angle error minus the correction band angle.

5. The method of claim 4, wherein the correction band angle is calculated in dependence upon the calculated track distance error.

6. The method of claim 5, further comprising:
   defining a distance threshold, a first band angle and a second band angle, the second band angle being smaller than the first band angle;
   setting the correction band angle to be the first band angle if the track distance error is greater than the distance threshold; and
   setting the correction band angle to be the second band angle if the track distance error is not greater than the distance threshold.

7. The method of claim 6, wherein the first band angle is 90°.

8. The method of claim 6, wherein the second band angle is 30°.

9. The method of claim 1, wherein the nominal track correction is calculated using a PD or PID controller.

10. The method of claim 1, wherein the nominal track correction is calculated using a PID controller incorporating wind-up compensation.

11. The method of claim 10, wherein:
   the PID controller calculates a proportional term, a differential term, and an integral term;
   the PID controller limits the integral term in dependence upon the upper limit and the lower limit to provide a limited integral term; and
   the PID controller outputs a signal based upon a weighted sum of the proportional term, the differential term, and the limited integral term.

12. The method of claim 1, wherein the nominal track correction is calculated using a tracking controller.

13. The method of claim 1, wherein the method is used to steer the aircraft to follow a predetermined track in a lateral plane.

14. A control system for steering an aircraft along a predetermined track, the control system comprising:
   a path tracking controller operative to receive a track angle error and a track distance error and to calculate a nominal track correction based on the track angle error and the track distance error;
   a correction bounds computer operative to determine an upper limit and a lower limit for the nominal track correction; and
   a correction limiter operative to
      receive the nominal track correction,
      determine if the nominal track correction is between the upper limit and the lower limit,
      set a desired track correction as the nominal track correction if the nominal track is between the upper limit and the lower limit,
      set the desired track correction as the upper limit if the nominal track correction is greater than or equal to the upper limit, set the desired track correction as the lower limit if the nominal track correction is less than or equal to the lower limit, and provide the desired track correction to a flight computer for steering the aircraft.

15. A control system for steering an aircraft along a predetermined track, the control system comprising:

a plurality of sensors operative to provide an aircraft position signal comprising a current position of the aircraft and an aircraft track signal comprising a current track of the aircraft;

a memory configured to store a predetermined track for the aircraft;

an error computer operative to receive the aircraft position signal and the aircraft track signal, to retrieve the predetermined track from the memory, to calculate a track angle error corresponding to an angle between the current track of the aircraft and the predetermined track, and a track distance error corresponding to a distance between the current position of the aircraft and the predetermined track; and a system operative to calculate a nominal track correction based on the track angle error and the track distance error, provide an upper limit and a lower limit for the nominal track correction, set a desired track correction as:

the nominal track correction if the nominal track is between the upper limit and the lower limit, the upper limit if the nominal track correction is greater than or equal to the upper limit, and the lower limit if the nominal track correction is less than or equal to the lower limit, and provide the desired track correction to a flight computer for steering the aircraft.

\* \* \* \* \*